Aug. 17, 1954 J. H. WILKINSON 2,686,632

DIGITAL COMPUTER

Filed Dec. 26, 1950 9 Sheets-Sheet 1

Inventor
James Hardy Wilkinson
By
Stevens, Davis, Miller & Mosher
his Attorneys

Inventor
James Hardy Wilkinson
By
Stevens, Davis, Miller & Mosher
his Attorneys

Inventor
James Hardy Wilkinson
By
Stevens, Davis, Miller & Mosher
Attorneys

Inventor
James Hardy Wilkinson
By
Stevens, Davis, Miller & Mosher
his Attorneys

James Hardy Wilkinson
Inventor
By
Stevens, Davis, Miller & Mosher
Attorneys

Inventor
James Hardy Wilkinson
By Stevens, Davis, Miller + Mosher
his Attorneys

Aug. 17, 1954 J. H. WILKINSON 2,686,632

DIGITAL COMPUTER

Filed Dec. 26, 1950 9 Sheets-Sheet 7

Inventor
James Hardy Wilkinson
By
Stevens, Davis, Miller + Mosher
his Attorneys

Aug. 17, 1954 J. H. WILKINSON 2,686,632

DIGITAL COMPUTER

Filed Dec. 26, 1950 9 Sheets-Sheet 8

Inventor
James Hardy Wilkinson
By
Stevens, Davis, Miller & Mosher
Attorneys

DIGITAL COMPUTER

Filed Dec. 26, 1950

Inventor
James Hardy Wilkinson
By
Stevens, Davis, Miller & Mosher
his Attorneys

Patented Aug. 17, 1954 2,686,632

UNITED STATES PATENT OFFICE 2,686,632

DIGITAL COMPUTER

James Hardy Wilkinson, Teddington, England, assignor to National Research Development Corporation, London, England, a British corporation Application December 26, 1950, Serial No. 202,615

Claims priority, application Great Britain January 4, 1950

5 Claims. (Cl. 235—61)

This invention relates to electrical digital computers working in the serial mode and in particular to means for effecting multiplication.

The present invention is applicable to computers in which numbers are stored in devices which may be arranged to deliver serial pulse signals representing the numbers in the binary scale of notation. A convenient form of such a storage device is the well-known acoustic delay line which consists essentially of a straight cylindrical tube filled with mercury and with a piezoelectric crystal at each end. If an electric pulse is applied to the crystal at one end of the line an ultrasonic wave travels down the line at the velocity of sound in mercury and at the other end is reconverted into an electric pulse by the other crystal. This new pulse may be amplified, reshaped and fed back to the input crystal and in this way the pulse or a whole pattern of pulses may be preserved indefinitely.

Another example of such a storage device is the magnetic recording store in which parts of a moving ferro-magnetic member are magnetised to record digits representing numbers in the binary scale of notation. Magnetic stores of this kind are described, for example, in United States patent application Ser. No. 146,446, filed February 27, 1950, by F. C. Williams; Patent No. 2,652,554, granted September 15, 1953, to F. C. Williams et al.; and patent applications Ser. No. 195,042, filed November 10, 1950, by F. C. Williams et al. and Ser No. 196,776, filed November 21, 1950, by James Dean et al.

According to the present invention there is provided means for multiplying two numbers each represented in the binary scale of notation by up to $n$ digits, characterized by a first serial store for storing $2n$ digits and arranged to be fed with the multiplier of the said two numbers, a unit delay circuit arranged to be fed during the multiplication process with the output from the said first serial store, a second serial store for storing $n$ digits and arranged to be fed with the multiplicand of the said two numbers, means for periodically extracting the output from the said unit delay circuit during each first digit period of the multiplicand during the multiplication process, an adder, means, operated by the output extracted from the said unit delay circuit for feeding the output from the said second serial store to one input of the said adder when the extracted output is a one, means for storing the output from the said adder and means for periodically feeding the output so stored to the other input of the said adder whereby at the conclusion of the multiplication process the said adder gives an output which represents the required product.

According to a feature of the invention the said means for storing the output from the said adder is the said first store and in this case there is provided further means for eliminating successive digits of the multiplier as they are extracted from the said unit delay circuit.

The invention will be described with reference to the accompanying drawings which employ a notation known to those skilled in the art of electronic digital computers. For those unfamiliar with this notation the basic symbols are shown with an example of an electronic circuit corresponding with the symbol. In most cases each basic symbol may be realised by a number of different electronic circuits.

Reference will be made to the accompanying drawings of which:

Figues 1 to 18 are used to explain the symbols and nomenclature used in this specification;

In the electronic digital computers numbers and instructions are represented by pulse patterns known generally as "words." It is convenient to refer to the pulse pattern as a number or instruction and this causes no confusion, thus to say that two numbers are fed to an adder means clearly, to one skilled in this art, that two pulse patterns representing two numbers are fed to a device arranged to give an output which is another pulse pattern representing the sum of the two numbers.

Figure 1:
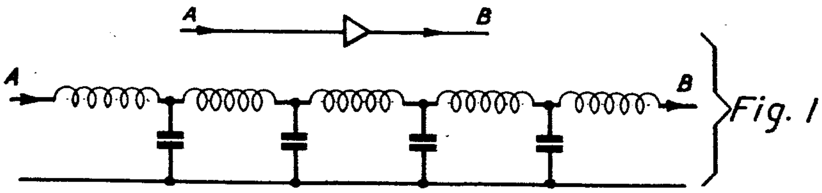

Figure 1 shows the symbol for a unit delay, that is to say a circuit for producing a delay equal to the time between the occurrence of a digit pulse and the pulse of next significance. The signal is travelling in the direction of the arrow, i. e. from A to B. One circuit for obtaining such a delay is the well-known artificial line shown diagrammatically in the same drawing. The values of the inductors and capacitors and the number of sections for any required delay and characteristic impedance may be calculated by a competent technician.

The same symbol when solid or shaded indicates a half unit delay. This may also be realised by a delay network.

Figure 2:
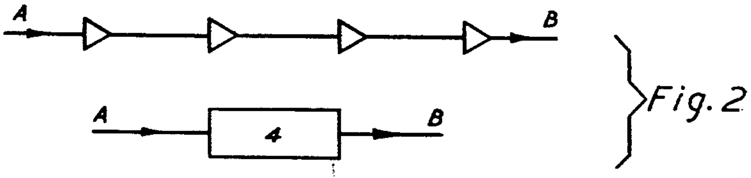

Figure 2 shows the symbol for a long delay, this is an elongated rectangle with the number of units of delay written in. It may be made up by a series of one delay units as indicated. Longer delays may be obtained by means of an acoustic delay line or an artificial electrical line. Delays are sometimes denoted by D-shaped symbols containing a number which indicates the delay time.

Figure 3:
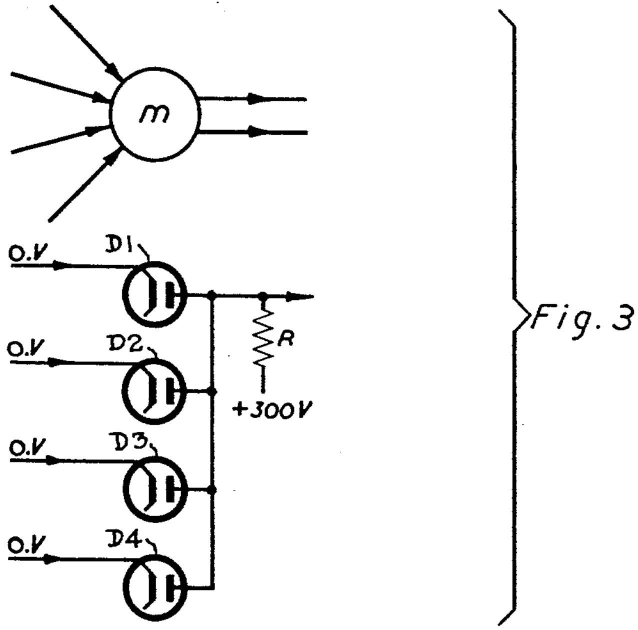

Figure 3 shows the symbol for gate or limiter, this is a circle with a number in (known as the threshold of the gate, in this case $m$) with any number of inputs and outputs. The gate gives an output of one (i. e. a pulse) on all output lines if the input is "$m$" ones and an output of zero otherwise. In a gate of threshold 1 the 1 is usually omitted, such a gate is generally known as an "or" gate. If the threshold is greater than one the gate is called an "and" gate.

Figure 3 also shows a circuit for realising a gate of threshold 4. This circuit comprises four diodes (thermionic or crystal) D1, D2, D3 and D4 with their cathodes normally held at earth potential and with their anodes commoned to form an output line and connected to, say, +300 volts through a resistance R. Normally the output line will rest at approximately zero volts, and this condition will not be disturbed if a positive pulse is applied to either cathode separately. If, however, positive pulses are applied simultaneously to all the cathodes the potential of the output line will rise to a potential which is approximately equal to the amplitude of the smallest of the pulses applied.

Figure 4:
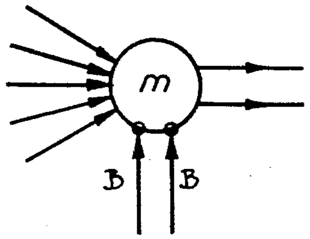

Gates may have a second type of input known as an inhibition input, this is indicated as at B in Figure 4. The output from the gate or limiter is zero if the input at B is a one, regardless of the other inputs. An input of zero at B has no effect.

A gate with inhibitive connections may take the form of the electronic circuit shown in Figure 3 in which one (or more) of the diodes to which the inhibitive pulse is to be applied is normally biased at a positive value, say +10 volts and the inhibitive pulse is applied negatively to the cathode of this diode bringing it down, during the incidence of the pulse, to earth potential. In this case the gate is closed during the incidence of the pulse and will not transmit positive pulses applied simultaneously to the cathodes of the other diodes. It will be appreciated that a diode gate of the kind shown in Figure 3 may require buffer stages before and/or after it. Other forms of gate circuit are shown in patent application Ser. No. 201,286, filed December 18, 1950, by E. A. Newman et al.

Figure 5:
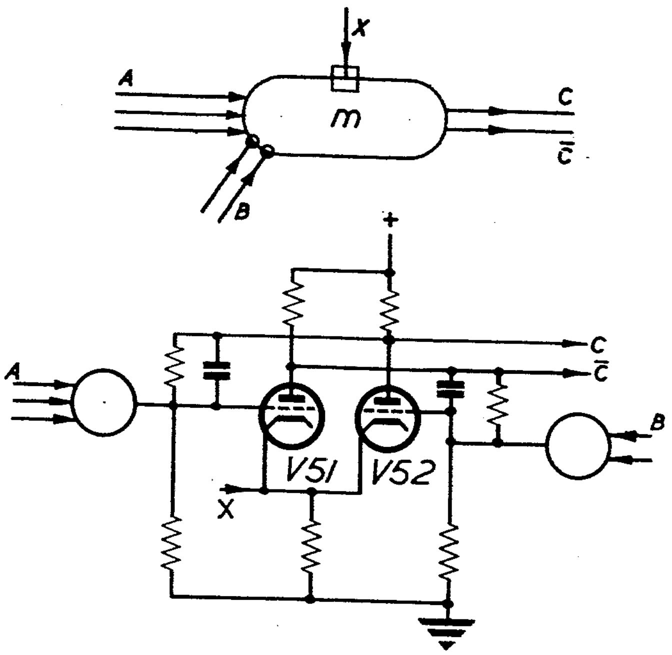

The symbol for a trigger of threshold $m$ is shown at Figure 5. This is an oval with the figure $m$ within it. It has any number of inputs and at least one inhibition connection. A trigger of threshold $m$ is "tripped" when it receives $m$ simultaneous ones and from then onwards its output at C is a steady potential until it receives a one on an inhibitive connection. It should be appreciated that the pulses forming a series of ones may coalesce so that the output from the trigger may be considered as a continuous series of ones when it is tripped. When an inhibiting pulse is received the trigger is said to be "re-set." The trigger is said to be on when emitting ones and off when emitting zeros. It is sometimes convenient to show a trigger with inverse outputs i. e. two outputs arranged so that when one is on the other is off. An inverse output is indicated by a bar as shown at $\overline{C}$ in the drawing. At a barred output, of course, the trigger emits ones when it is off and zeros when it is on.

A trigger may also have a "changeover" input indicated as at X in Figure 5. If a trigger receives a one at this input, its state is changed, that is to say, if the trigger was on it becomes off and vice versa.

An equivalent circuit is also shown in the same drawing. This comprises the well-known two state trigger circuit. A positive pulse applied at A will cause V51 to conduct and hence a rise in potential at the anode of the other valve. This state will continue until the circuit receives a positive pulse at B when valve V52 will start conducting and its anode potential will fall. The normal output is taken from the anode of valve V52 and the inverse output from the anode of V51 as indicated by C and $\overline{C}$.

The changeover connection is the comon cathode connection shown at X. Thus if valve V51 is conducting a short positive pulse on the cathodes will cause the anode current to stop which will produce a sudden rise in anode potential on V51 which is transmitted to the grid of valve V52 and causes that valve to conduct instead of V51 and vice versa.

Figure 6:
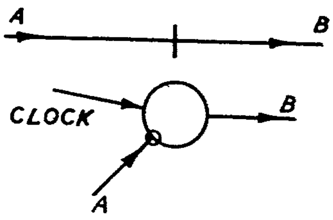

A short stroke across a line, as in Figure 6, is used to indicate a change of polarity, i. e. zeros and ones are interchanged. A word thus treated is said to be negated or complemented. The equivalent circuit is shown in the same figure, thus a number is applied to an inhibitive connection of a trigger at A and a series of ones is applied at the input marked "Clock," the output from B will then be the equivalent of the input at A with a change of polarity.

Figure 7:

A circle containing an E, shown in Figure 7, denotes an element which emits a one only at the termination of a long pulse at its input. A circle containing a B, shown in Figure 8, emits a one only at the beginning of a long pulse.

Figure 8:
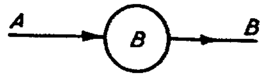
Figure 9:
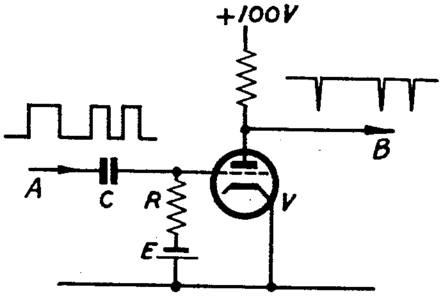

The elements symbolised in Figures 7 and 8 may be realised by the differentiating circuit shown in Figure 9. This comprises a condenser C and a resistance R followed by a valve for selecting the pulse generated by the differentiating circuit, thus in the circuit shown, if positive pulses are applied at A at the beginning of these pulses, a sharp positive pulse will be applied to the control grid of the valve V, which is normally biased to cut-off by the battery E. The result is that at the beginning of each square pulse supplied at A, a sharp negative pulse is generated at the anode of the valve V. The circuit then constitutes the beginning device shown in Figure 8. If the pulse supplied at A is negative going the circuit will constitute an end device of the kind shown in Figure 7.

Figure 10:
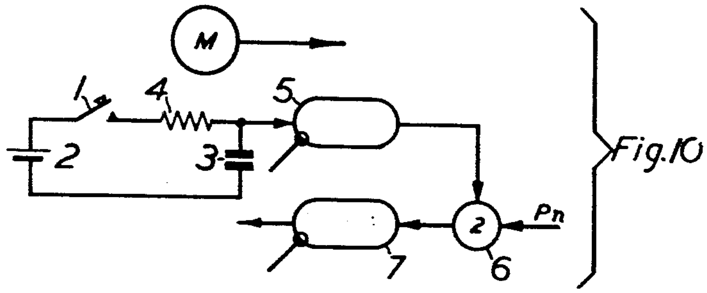

A manual press button is shown by an M in a circle as at Figure 10. It is understood that such an element starts to emit ones some short but unpredictable time after the pressing of a button. In practice this is a somewhat difficult element to realise owing to chatter on manual switch contacts, it may be done as illustrated in the same figure. Thus the manual switch 1 closes a circuit and allows the cell 2 to start charging the capacitor 3 through the resistor 4. The potential on 3 rises steadily until it trips the trigger 5 which opens the gate 6 and lets through a selected applied pulse $P_n$ which trips a further trigger 7 to start a series of ones.

In digital computors employing the binary system of rotation the individual unit of information is, of course, the digit which may take the values 0 and 1 but it is convenient to consider units consisting of aggregates of digits. It will be assumed that the present invention relates to a machine dealing with words (i. e. numbers or instructions) of 32 digits. The application of the invention to a machine employing words of more or less than 32 digits will be obvious. It will also make the description clearer if it is assumed that the inter-digit period is, say, one microsecond.

A group of 32 digits is then said to occur in one minor cycle.

Figure 11:
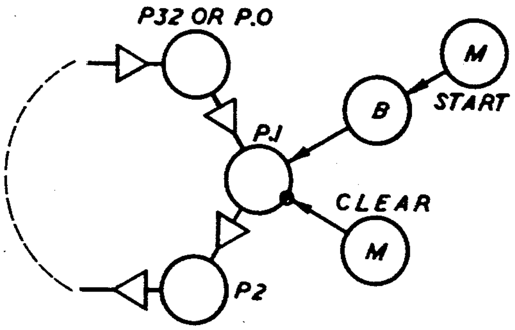

This division of time into minor cycles is provided by a circuit known as a ring counter. It is, effectively, an electronic commutator and its circuit is shown in Figure 11. It consists of a group of 32 "or" gates in a ring, each of which is separated from the two adjacent elements by a unit delay; the outputs from the 32 gates are known as P1, P2, . . . P32. At the beginning of operations the "Clear" push button is operated; this removes any stray pulses in the ring counter; the "Start" push button is then operated and this puts a single pulse into the P1 gate. At any subsequent time one and only one of the gates will be emitting a pulse.

The elements of the ring counter are frequently used in the control circuits of digital computers to supply ones at definite points in a minor cycle. The element P1 e. g. supplies a one at the beginning of each minor cycle and thereafter 31 zeros. The pulses supplied by the element P*n* are usually referred to as "P*n* pulses," and the notation, P*n*, is also used to denote the sequence of digits supplied by the element P*n* in any minor cycle. This use of "P*n*" may appear to be somewhat ambiguous, but in practice the meaning is always abudantly clear from the context. A pulse P*n* may be delayed half a unit and may then be referred to as P*n*½.

A computing machine will comprise a series of stores each capable for storing a number of words, say 32, in this case it will be convenient to refer to a period of 32 minor cycles, i. e. 1024 digits, as a major cycle.

Figure 12:
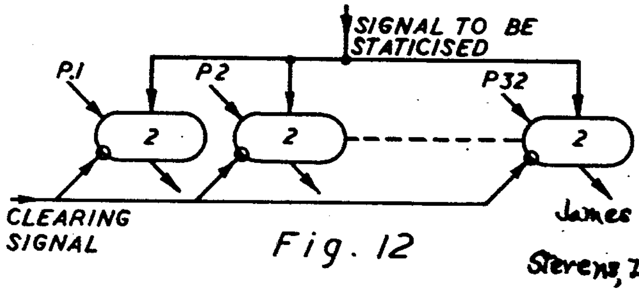

In a number of positions in the circuits it is necessary to convert information from the dynamic form, as a temporal sequence of digits or pulses, into a static form consisting of D. C. voltages on a number of lines, corresponding to the number of pulses. In Figure 12 the circuit used for "staticising" a word of 32 digits is given. It consists of a group of 32 triggers of threshold two, each of which receives the signal to be staticised and one of the P*n* pulses. The *n*th digit of the signal to be staticised trips the *n*th trigger if it is a one, and fails to trip it if it is a zero. There is also a lead for resetting all the trigger circuits; this must be pulsed before a second word can be "set up" on the staticiser.

Figures 13, 14:
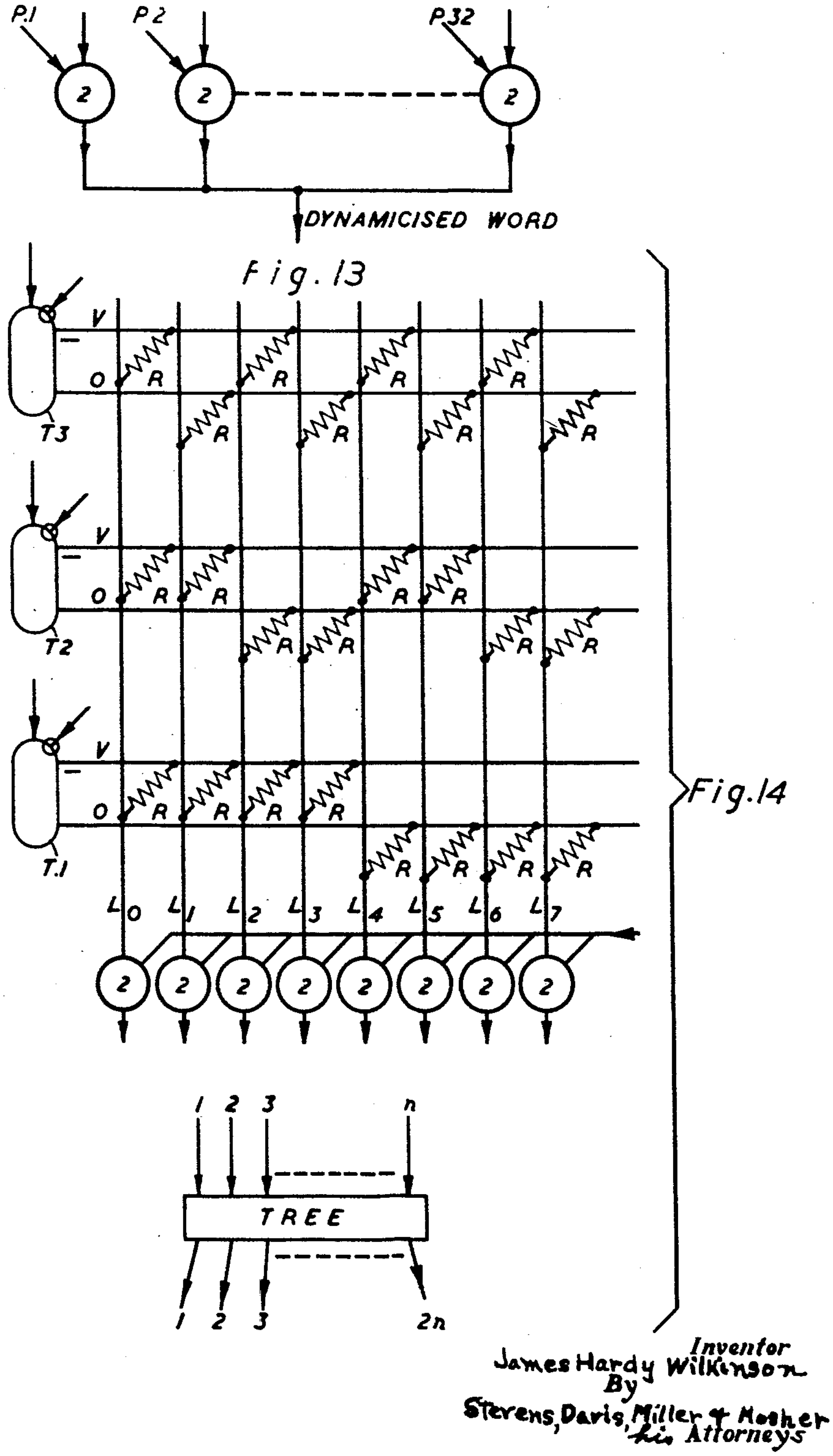

Conversely it is often necessary to convert a number of static signals into the dynamic form. The static signals may come from triggers or be obtained from a set of switches. The circuit for performing this operation is shown in Figure 13. It consists of a set of 32 gates of threshold two, each of which is supplied with a P*n* and one of the static signals. The outputs from the gates are combined together to produce the static signals, in dynamic form, once per minor cycle.

If we consider a set of *n* triggers then there are 2*n* possible states in which they can be, since each one may be either "on" (emitting ones) or "off" (emitting zeros). It is frequently necessary to use a set of *n* triggers to provide an unbroken stream of ones on one of 2*n* different lines. There are a number of different electronic circuits for performing this selection, of which perhaps the most common is a resistance network. Any circuit which performs this operation is referred to as a "tree of order *n*," and is represented as in Figure 14.

Whenever we have *n* different sources of D. C. voltage each of which may take one of two different voltages we may use these *n* sources to select one of 2*n* different lines, i. e. as the basis of a tree of order *n*. Triggers are the most common examples of such sources of D. C. voltages.

As an example a tree of order three is shown in the upper part of the Figure 14. This comprises a network of resistances R, all equal and connected as shown. The tree has as input the three pairs of outputs from three triggers T1, T2 and T3. Suppose that all triggers are off, corresponding with a code signal 000, then the barred outputs all carry a voltage V and the normal output zero. In this case it can be shown that the voltage on the output line L0 of the tree is V, that on the line L7 is zero, while three of the other lines have a voltage 2V/3 and the remaining three have a voltage of V/3. If, therefore, a voltage V is required to open the "and" gates on the output lines L0 to L7, then only that gate on line L0 will be opened.

Other lines may be selected by other states of the triggers T1, T2 and T3. For example, suppose the gate on line L5 is to be opened then the triggers are set up, in accordance with the code signal 101, so that T1 and T3 are on and T2 is off. If the gate on line L2 is to be opened then the code signal is 010 and triggers T1 and T3 are off and T2 on, and so on for any other line.

Figure 15:
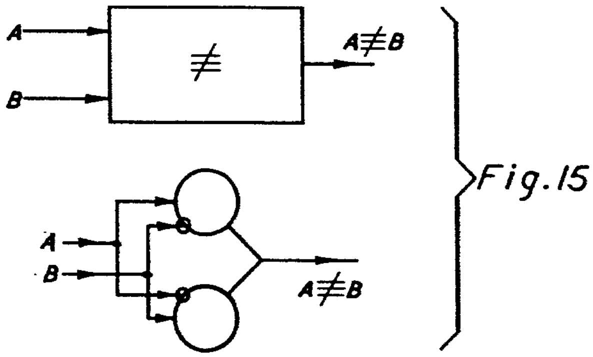

Another element frequently used in digital computers is the "not equivalent" element. This is indicated as in Figure 15. It yields an output whenever the inputs at A and B differ, the circuit diagram is shown in the same figure.

Figure 16:
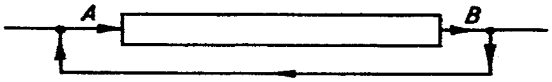

The acoustic delay line, which is often called a tank, has already been described and it is symbolized as in Figure 16. Two standard lengths of delay lines are normally used in digital computers. The first type, usually a long tank may be of such a length that a sound wave takes, say, 1024 microseconds (i. e. one major cycle) to travel down the tube. Since pulses have been assumed to be one microsecond apart, a long tank may be used to store 1024 digits or 32 words. The configuration of pulses in a long tank recurs once per major cycle. The other type of delay line, usually called a short tank or temporary storage, is capable of storing 32 digits only i. e. exactly one word. The configuration in a short tank recurs once per minor cycle.

Figure 17:
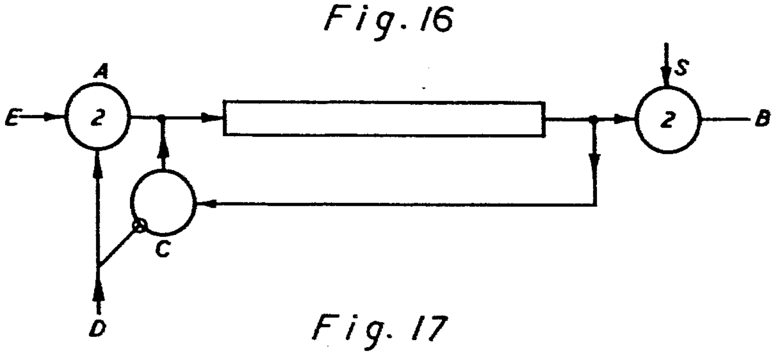

In addition to the circuits needed for the recirculation, each tank is equipped with an input and an output device. These are as shown in Figure 17. If any unbroken stream of ones is supplied along the line marked S, a copy of the contents of the tank is obtained at B, the circulation of the content of the tank being undisturbed. If, on the other hand, an unbroken stream of ones is supplied along the line marked D and a new sequence of digits is fed in at E, this new sequence passes into the tank, whilst the former contacts are obliterated at C.

It has already been stated that the invention relates to computers in which numbers are stored in the binary system of notation. As far as the units which perform the arithmetic operations are concerned these numbers are treated as though they are integers. The true position of the binary point will vary from problem to problem to suit convenience and its correct manipulation in any given problem will be taken care of by the programming. It is possible that some problems will arise which will necessitate the use of a floating binary point. This means that each number will be represented by an ordered pair of numbers, $m$ and $n$, the first of which is an integer (positive or negative) and the second satisfies $-1 \leq n < 1$. The number corresponding to the ordered pair $(m, n)$ is $2^m n$. In such problems the basic arithmetic operations will also be programmed; in general it may be said that a floating binary point will only be used when it proves impossible to estimate the necessary number of digits required to represent numbers involved in the calculation without undue effort. In most problems its use may be eliminated by adjusting the binary point from time to time during the computation, as this becomes necessary.

If for the moment it is agreed to consider numbers as integers and make one word available for each number, then all integers $n$ such that $-2^{31} \leq n < 2^{31}$ can be represented by the following convention. The integer $n$ is to be represented, modula $2^{32}$, by a number, $n'$, such that $2^{32} > n' > C$. In this convention all negative numbers have a 1 in the extreme left hand position and all non-negative numbers 0. For this reason $-2^{31}$ is included and $+2^{31}$ is excluded. Each number, then, may be said to consist of 31 digits and a sign digit.

If numbers two words in length are used, then all integers $n$ such that $-2^{63} \leq N < 2^{63}$ may be represented. A number is now represented by 63 digits and a sign digit. Similarly, if we allow $m$ words for our numbers, each number is represented by $(32m-1)$ digits and one sign digit in the extreme left hand position. A small number, regarded as a number represented in the $m$ word convention, will begin with a long string of zeros if positive, and a long string of ones if negative.

Figure 18:
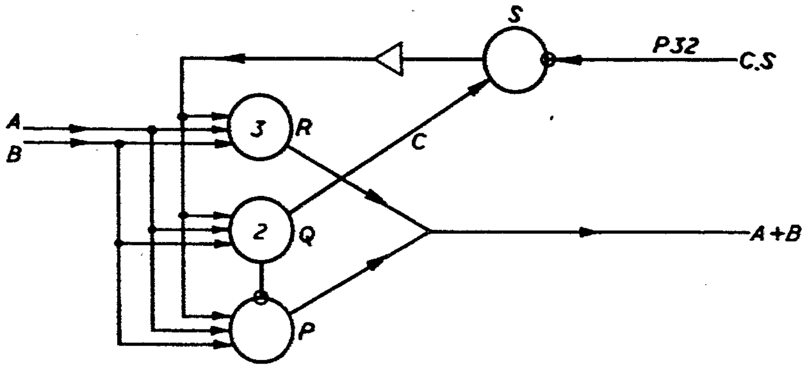

The present invention entails the use of an adder and a circuit for a suitable adder is shown in Fig. 18. To understand how it performs addition, suppose two sequences of digits $a_n$, $b_n$ corresponding to numbers A and B are fed in to the adder on the lines on the left hand side. These two sequences must, of course, be in phase, i. e. the digits in the least significant position must arrive simultaneously. For each digit of the sum $(A+B)$ except the first we have to consider the problem of adding the two current digits of A and B and the carry over from the previous digit, and forming from them the current digit of $(A+B)$ and the carry over to the next digit. The current digit of $(A+B)$ is fed out on the line marked $(A+B)$ and the carry digit is borne by the line marked C. The carry digit is delayed one unit before it arrives at R. At any stage of the addition, then, the current digits of A and B and the carry over from the previous stage are each fed to all three of the elements P, Q and R. It is now sufficient to consider four simple cases.

(i) P, Q and R are each fed with three zeros. In this case a zero is emitted for the current digit of $(A+B)$ and for the carry digit.

(ii) P, Q and R are fed with two zeros and a one. In this case Q and R emit zeros and P emits a 1 on the (A and B) line. The carry digit is therefore zero and the current digit of $(A+B)$ is a one.

(iii) P, Q and R are fed with one zero and two ones. In this case R emits a zero but P and Q both have sufficient inputs to emit a one. The one emitted by Q however inhibits P and the net effect is that a zero goes out from P to give a zero for the current digit of the sum; and a one goes out on the carry line from Q.

(iv) P, Q and R are fed with three ones. In this case the threshold of all three elements is reached. Again P is inhibited by the output of Q and therefore puts out a zero but R emits a one as the current digit of the sum, and Q gives a carry digit of one on the line C.

It will be seen that each of the above cases gives the result required by the rules of binary addition. The first digit does not require any special consideration. Clearly there is no carry from the "previous stage" and hence there is a zero on the line marked D.

So far it has been tacitly assumed that the numbers are indefinitely long and all reference to the element marked S with the inhibiting connection marked C. S. has been omitted. Suppose now numbers are restricted to be one word in length. Then with the above described convention for numbers with a sign, even in the simplest case of the addition of two positive numbers, the adder does not give the correct answer unless it lies in the permitted range. E. g. consider the addition of $2^{30}+1$ to $2^{30}$ shown below.

```
0100 ---------------------------------- 001+
0100 ---------------------------------- 000
------------------------------------------------
10 ------------------------------------ 001
```

The answer given by the adder interpreted by the same convention is negative since it has a 1 in the extreme left hand position; it is in fact, $-2^{31}+1$ according to this convention. Hence if the convention is to be used all the time the answer to this addition is congruent with the true answer, modulo $2^{32}$. Provided the true sum is such as to lie in the permitted range, however, it will be exact. Consider now the addition of 6 and $-5$. The number 6 will be represented by 6 but the number $-5$ will be represented by $2^{32}-5$. The addition as performed by the adder is shown below.

```
0000-----------------00110 representing 6
1111-----------------11011 representing -5
1 000000---------------00001
```

The adder will produce first a 1 and then 31 zeroes but it will also produce a carry one from the thirty second digit. This carry over at the thirty second digit is suppressed by feeding a P32 on the lead marked C. S. (carry suppression) at the end of each minor cycle. By this means the adder can perform correctly the addition of any two numbers, either positive or negative, which lie in the range permitted by the convention, provided the true sum also lies in this range. Otherwise the sum given by the adder, interpreted in the convention described will only be correct modulo $2^{32}$. In the addition of double length numbers a similar problem arises, but now it is necessary to suppress the carry over at the P32 position corresponding to the sign of the number and not to suppress it at the P32 position occurring in the middle of the number. This is achieved by means of a source which gives a P32 at the end of alternate minor cycles. Full consideration of this point and the addition of multiple length numbers is given later.

Another type of adder suitable for use in the present invention 20 is described in patent application Ser. No. 201,286, filed December 18, 1950, by E. A. Newman et al.

The process of multiplication will now be considered and for the sake of simplicity, the question of sign will be ignored for the time being. Thus suppose it is required to multiply two positive numbers A and B each of which is less than $2^{32}$. We define $a_n$ and $b_n$ to be the $n$th binary digits of A and B, $a_1$ and $b_1$ being the least significant and there being 32 binary digits in each number. If either of the numbers is small there will be a number of zeroes in the more significant places of that number. The product X, of the two numbers, may be regarded as a 64 digit number of which any number of the more significant digits may be zeros. If the number A be regarded as the multiplier and B as the multiplicand then the product may be formed in the following steps:

$X_1=a_{32}B$ ------------------------------- (1)

$X_2=2X_1+a_{31}B$ ------------------------------- (2)

$X_3=2X_2+a_{30}B$ ------------------------------- (3)

. . . . . . .

$X_n=2X_{n-1}+a_{33-n}B$ ------------------------- ($n$)

. . . . . . .

$X=X_{32}=2X_{31}+a_1B$ ------------------------- (32)

The number $X_i$ may be called the $i$th partial product. To form $X_{i+1}$ from $X_i$, A and B, we multiply $X_1$ by 2 and add to it B or zero according as $a_{32-i}$ is one or zero.

Figure 19:
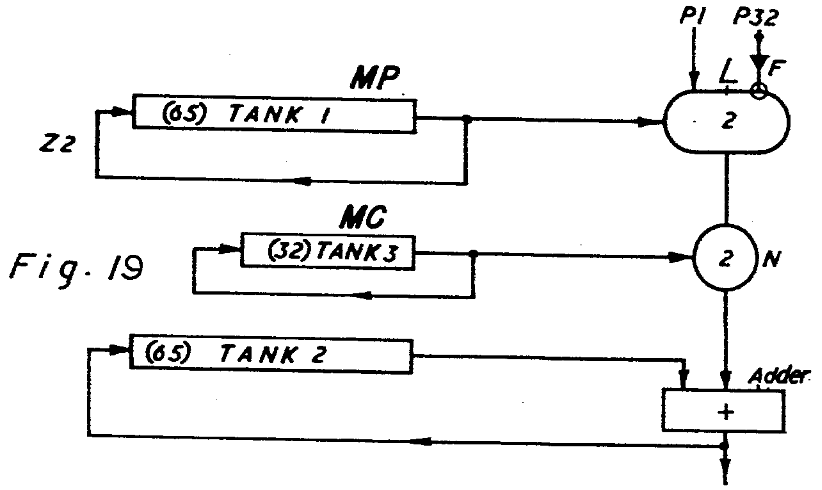
Figure 19 shows one embodiment of the invention.

One embodiment of the invention is illustrated in Figure 19 and includes two tanks of length 65 units and one ordinary short tank. For the sake of simplicity in this picture the input and output devices for the three tanks are omitted. Suppose that initially the two 65 digit tanks are empty and the 32 digit tank contains B, and that in minor cycle number "$m$" the multiplier A is sent to tank 1 (i. e. the upper 65 digit tank). Nothing will happen until the trigger L is tripped and this can only occur if tank 1 emits a one at time P1. Throughout the multiplication, tank 1 will contain the multiplier and 33 zeros. The first opportunity L has to be tripped is at the P1 time of minor cycle $(m+3)$ which we denote by $(m+3)_1$; at this time the $a_{32}$ digit is received by L which will, therefore, be set up or not according as $a_{32}$ is a 1 or 0. When L is set up, it emits 32 consecutive ones and is then stopped by P32 applied through the half unit delay F. This enables the contents of tank 3 (i. e. B) to pass through N. During minor cycle $(m+3)$ then, $a_{32}$B passes into the adder A$d$ and is added to the contents of tank 2 (i. e. zero) to form $X_1$. In $(m+4)_1$, one of the 33 zeros is omitted from tank 1 and therefore L is not tripped. Since tank 1 is of length 65 its contents are delayed one unit for each circulation and therefore in $(m+5)_1$, tank 1 emits $a_{31}$. Hence the adder receives $a_{31}$B via N. The content of tank 2 will also be delayed one unit and will therefore be transmitting $2X_1$, to the adder. Tank 2 therefore receives $(2X_1+a_{31}B)$ i. e. $X_2$ during minor cycle $(m+5)$ and the 1st digit period of $(m+6)$ if $X_2$ should be as long as 33 digits. Similarly in $(m+6)_1$ the trigger L receives one of the 33 zeros and in $(m+7)_1$ it receives $a_{30}$. Hence in $(m+7)$ and $(m+8)$ tank 2 receives $X_3$. The process proceeds with L receiving the successive digits of A and one of the 33 zeroes in alternate minor cycles, and tank 2 receiving the successive partial products. It is evident that tank 2 receives $X_i$ from the adder during minor cycles $(m+2i+1)$ and $(m+2i+2)$ and therefore the product X of $X_{32}$ is available at $Z_1$ in minor cycles $(m+65)$ and $(m+66)$.

Figure 20:
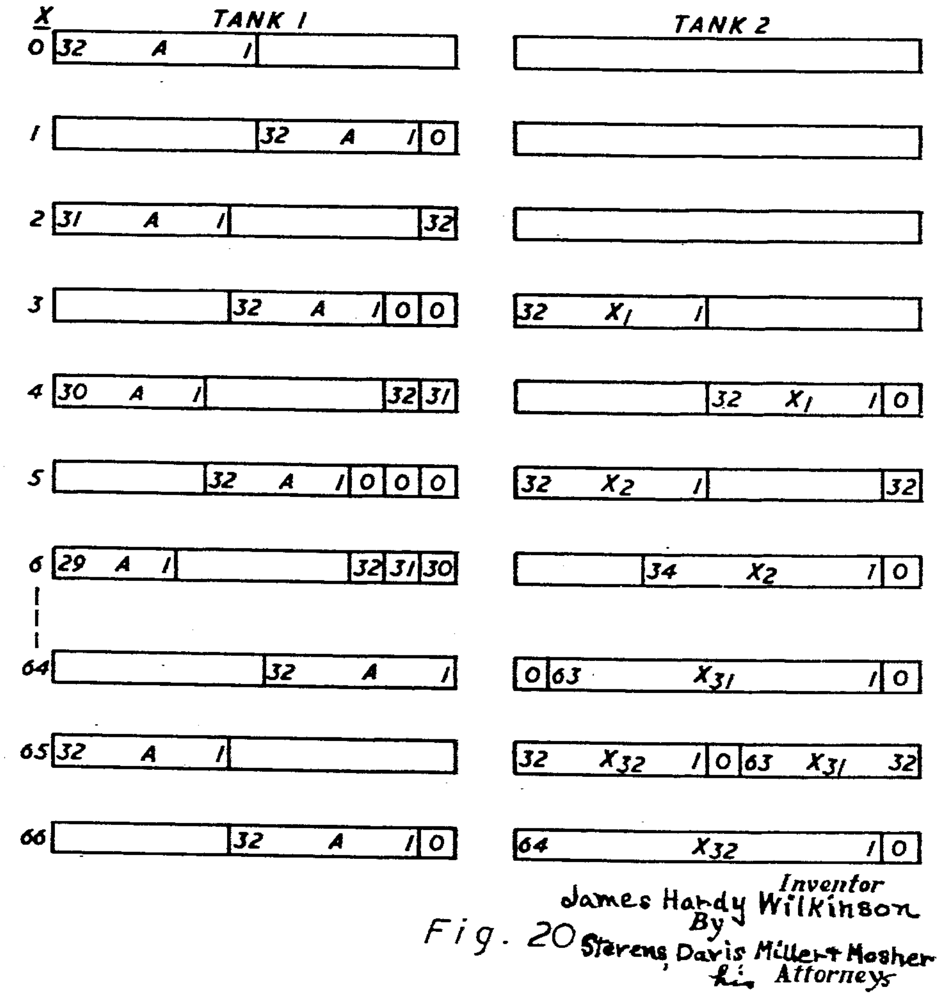
Figure 20 is used to explain the operation of the circuit shown in Figure 19.

The contents of tanks 1 and 2 at the end of minor cycle $m+x$ for $x=0\ .\ .\ .\ 66$ are shown in Figure 20. The multiplier has been described with two tanks of length 65 for clarity; the second tank of length 65 can easily be dispensed with in the following manner. The partial product $X_i$ cannot contain more than $32+i$ digits, and at the stage at which it is formed full use of $i$ digits of the multiplier has already been made. If the successive digits of the multiplier are obliterated immediately after use, then the partial products may be stored in the same tank as the remaining part of the multiplier and there will, in fact, always remain one zero at least between the partial product and this remainder of the multiplier. Hence, in another embodiment of the invention, tank 2 is removed, the output of tank 1 is fed into the adder and the output of the adder back to the input of tank 1. The only other alteration (in addition to the simple device for removing the successive digits of the multiplier as they are used) is that trigger L, must now be supplied with alternate P1's only. This is because in the embodiment shown in Figure 19 the tank 1 contained the multiplier and 33 zeros, and one of these zeros reached L at alternate P1 times, but in this modification the space occupied by those zeros is now replaced by the partial products and these must not be allowed to trip L.

Figure 21:
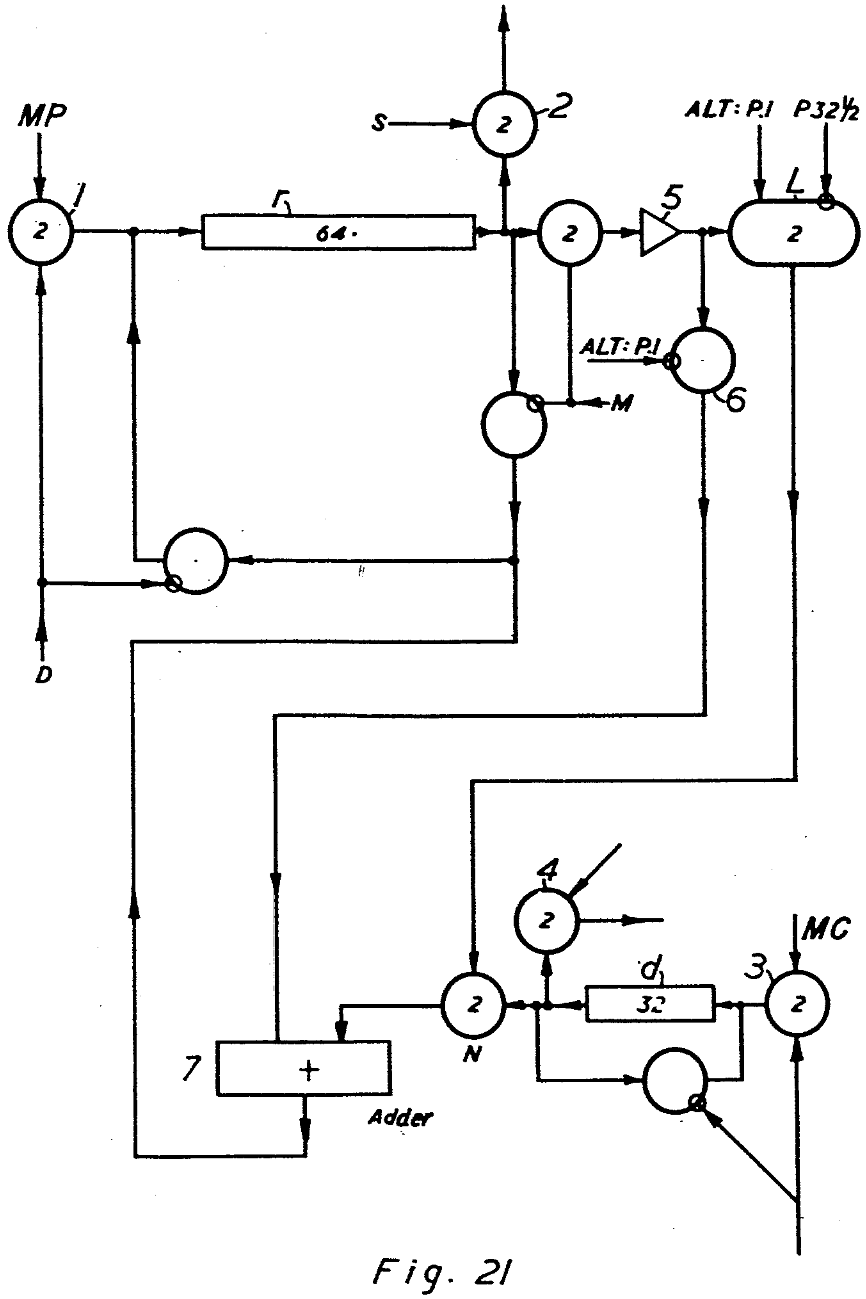
Figure 21 shows the preferred embodiment of the invention.

This modified and preferred embodiment of the invention is shown in Figure 21. In this drawing the delay lines are shown with their input and output gates, and the 65 digit tank is effectively replaced by a 64 digit tank $r$ and a unit delay 5.

The tank $r$ is fed with the multiplier through the gate 1 opened by a long pulse applied at D and its output taken through 2 by a long pulse applied at S. Similarly the tank $d$ is fed with the multiplicand through 3 and the multiplicand can be taken out for re-storing if necessary through 4. During the required part of the multiplying period, a long pulse is applied at M so that during this period the multiplier circulates through the unit delay 5, the gate 6 and the adder.

Figure 22:
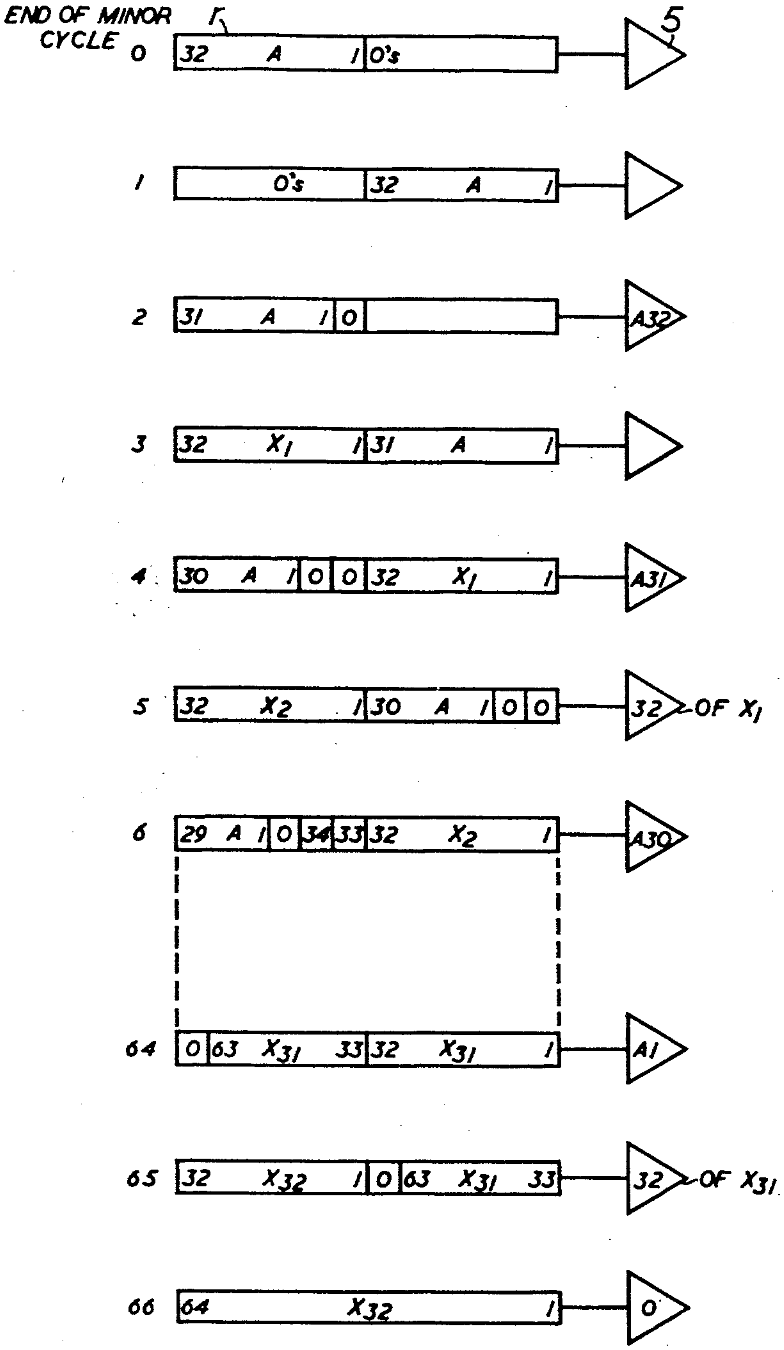
Figure 22 is used to explain the operation of the circuit shown in Figure 21.
Figure 23:
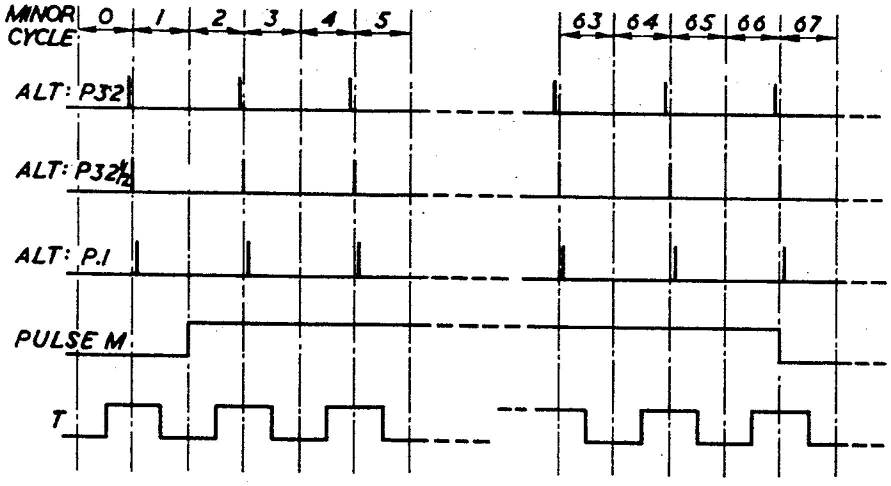
Figure 23 shows the waveform of some of the pulses used in the circuit shown in Figure 21

The main working of this embodiment will be clear from the foregoing description. Alternate P1's (starting in the $(m+3)$th minor cycle) are applied to the trigger L and also to the gate 6, thus as the digits of the multiplier are used to set the trigger L they are eliminated at the gate 6 and so make room in the delay line $r$ for digits of the partial products coming from the adder. When the multiplication is completed the product is in the line $r$ and then circulates, owing to the cessation of the pulse at M, through the normal regeneration circuit and can be taken off through the gate 2 when required. The contents of the long tank $r$ and the unit delay 5 during the minor cycles 0–66 of the multiplication process are illustrated in Figure 22. The pulses necessary for operating the embodiment shown in Figure 21 are illustrated in Figure 23. It will be seen that the pulse M starts just before the beginning of minor cycle 2 and ends just after the end of minor cycle 66. The necessary alternate P1's and P32½'s are shown in the same diagram. It is desirable in a computing machine that once a multiplication process is ordered, it should take place automatically so that the programmer can call for the product at some convenient time more than 66 minor cycles later. This result is obtained by means of a circuit which initiates and determines the multiplication pulse M at the correct times.

Figure 24:
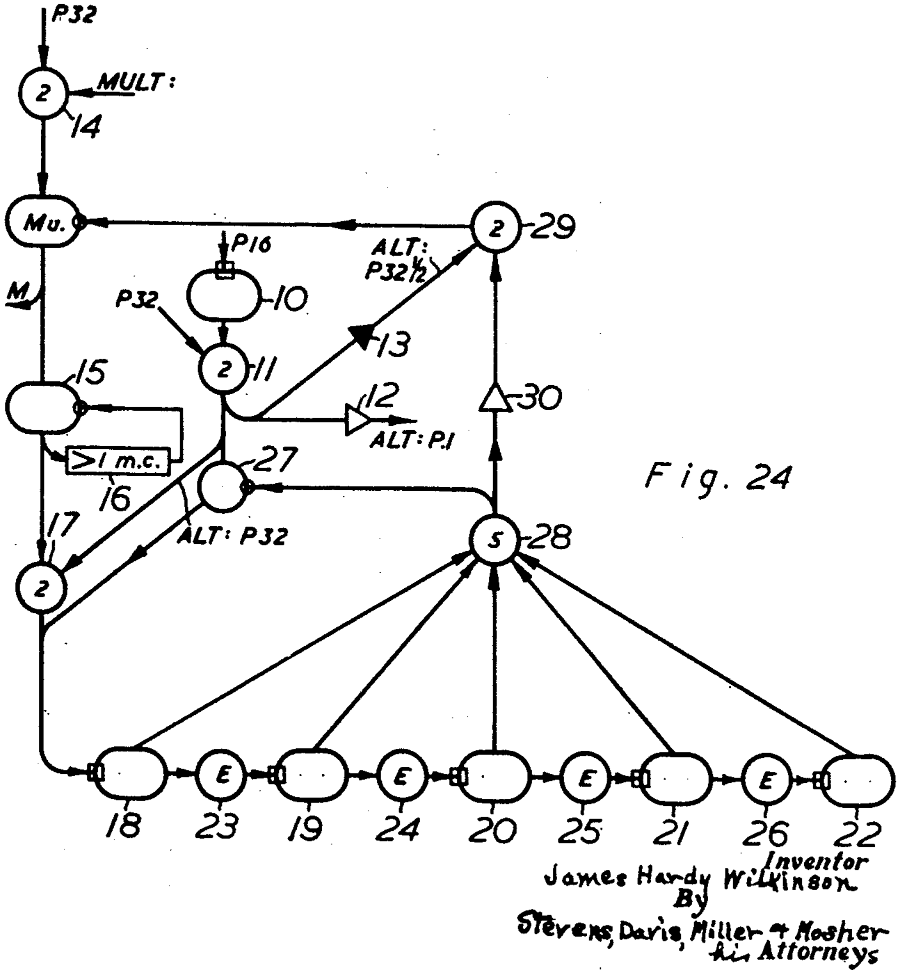
Figure 24 is a circuit for generating some of the pulses shown in Figure 23.

A circuit for obtaining such a pulse and also the other pulses necessary for operating the embodiment illustrated in Figure 21 is shown in Figure 24. In this circuit a trigger 10 is operated by a P16 pulse applied at a changeover input and gives an output of the form shown at T in Figure 23. The output is used to condition an "and" gate 11 which is also fed with P32 pulses so that the output from the gate 11 is a source of alternate P32 pulses which also yield through the unit delay 12 and the half unit delay 13 alternate P1 and P32½ pulses respectively. The programme of a calculation is arranged so that the multiplier enters the tank $r$ in a minor cycle (minor cycle 0 in Figures 22 and 23) which contains one of the alternate P32 pulses generated by the circuit shown in Figure 24.

The trigger *Mu*, the output of which is the pulse M applied in Figure 21, is put on at the end of minor cycle 1 by P32 pulses through the gate 14 conditioned by a potential at *Mult.* This potential is generated at the correct time by the programme of the calculation. The trigger *Mu* also puts on a trigger 15 which puts itself off through the delay 16 at some time just over a minor cycle later. The trigger 15 conditions the end gate 17 and allows the alternate P32 occurring at the end of minor cycle 2 to operate a counting circuit. This counting circuit comprises the five triggers 18–22 connected in cascade by changeover connections with end elements 23–26 in between. The triggers 18–22 are initially all on because the circuit is arranged so that at the end of the multiplication the triggers are left in this condition and in any case alternate P32 pulses will pass through the gate 27 until this state of affairs is obtained after which the pulses will then be stopped at the gate 27 by the output from the gate 28 of threshold five.

The first alternate P32 passing through the gate 17 puts all the triggers off and subsequent alternate P32 pulses pass through the gate 27 and are counted by the counting circuit until the triggers 18–22 are all on again. This state is reached at the end of minor cycle 64 as can be seen from the following scheme in which 0 represents a trigger off and 1 a trigger on.

| End of Minor cycle | State of triggers |
|---|---|
| 0 | 11111 |
| 2 | 00000 |
| 4 | 10000 |
| 6 | 01000 |
| 8 | 11000 |
| 10 | 00100 |
| . | . |
| . | . |
| . | . |
| 62 | 01111 |
| 64 | 11111 |

At the end of minor cycle 64 the counter stops counting because the gate 27 is now closed and the gate 17 has been closed for some time since the trigger 15 will have gone off just over a minor cycle later than the time at which it went on. The potential out of the gate 28 is also applied through a delay 30 to the end gate 29 and is not in time to open this gate to let through the alternate P32½ pulse in minor cycle 64. It will however let through the next P32½ pulse which puts the trigger *Mu* off at the end of minor cycle 66, as required. It will be seen that the triggers 18–22 are left all on and this part of the circuit is ready for another multiplication.

So far the multiplication of positive numbers only has been considered and the sign convention ignored. Suppose now the multiplier as it stands is used to form the product of plus six and minus five. These numbers will be represented by 6 and $2^{32}-5$ and hence it will produce the answer $6(2^{32}-5)$. To produce the correct answer regarded as a signed number of two word length we must add $2^{32}(2^{32}-6)$ using a two word adder; this gives $2^{64}-30$ which is the correct answer within the convention. For the multiplication of minus six by minus five, the multiplier produces $(2^{32}-6)$ $(2^{32}-5)$. If this result is added to $2^{32}\times 6$ and $2^{32}\times 5$ by a two word added then the true answer, 30, will be obtained since the extra $2^{64}$ will be the carry which is suppressed.

It is easy to see from these examples that, in order to obtain the true answer for the product of two signed numbers in the standard convention for two-word signed numbers, the value given by the multiplier must be corrected according to the following rule:

If either of the factors is negative then we must add $2^{32}\times(2^{32}-\text{other factor})$ using a two-word adder. This addition may be allowed for in the programming of the computation.

If the adder in Figure 21 is the normal adder of the computer its normal round carry suppression must be inhibited during the multiplication process. This may be done by an inhibitive connection on the round carry suppression gate which is fed with the pulse M.

What I claim is:

1. Means for multiplying two numbers each represented in the binary scale of notation by up to $n$ digits, characterised by a first serial store for storing $2n$ digits and arranged to be fed with the multiplier of the said two numbers, a unit delay circuit connected in the circulation circuit of the said first serial store, a second serial store for storing $n$ digits and arranged to be fed with the multiplicand of the said two numbers, means for periodically extracting the output from the said unit delay circuit during each first digit period of the multiplicand during the multiplication process, an adder, means operated by the output extracted from the said unit delay circuit for feeding the output from the said second serial store to one input of the said adder when the extracted output from the said unit delay circuit is a signal representing a value of one, a serial store for storing two $n$ digits and connected to include the said adder and the unit delay in its circulation circuit whereby at the conclusion of the multiplication process the said adder gives an output which represents the required product.

2. Means for multiplying two numbers each represented in the binary scale of notation by up to $n$ digits, characterised by a first serial store for storing $2n$ digits and arranged to be fed with the multiplier of the said two numbers, a unit delay circuit arranged to be connected during the multiplication process in the circulation circuit of the said first serial store, a second serial store for storing $n$ digits and arranged to be fed with the multiplicand of the said two numbers, means for periodically extracting the output from the said unit delay circuit during each first digit period of the multiplicand during the multiplication process, an adder, means operated by the output extracted from the said unit delay circuit for feeding the output from the said second serial store to one input of the said adder when the extracted output from the said unit delay circuit is a signal representing a value of one, means for feeding the output from the said adder to the said first serial store, means for periodically feeding during the multiplication process the output from the said unit delay circuit to the other input of the said adder and means for eliminating successive digit pulses of the multiplier as they are extracted from the said unit delay circuit and before they are fed to the said other input of the said adder whereby at the conclusion of the multiplication process the said adder feeds into the said first serial store an output which represents the required product.

3. Means for multiplying two numbers according to claim 1 and comprising a trigger arranged to condition an and gate between the said second serial store and the said adder, said trigger being arranged to be put on for one minor cycle during the first digit period of the said multiplicand when the output extracted from the said unit delay circuit is a one.

4. Means for multiplying two numbers according to claim 2 and in which the said serial stores each comprise an acoustic delay line.

5. Means for multiplying two numbers as claimed in claim 4 and in which the output from the said first serial store is fed to the said unit delay circuit through an and gate which is conditioned by a potential existing throughout the multiplication process, the said potential also closing an inhibiting gate arranged in the recirculation circuit of the said first serial store.

References Cited in the file of this patent

"Progress Report (2) on the EDVAC," Moore School, University of Pennsylvania, dated June 30, 1946; declassified February 13, 1947; pages 1-4-1 and 1-4-2, drawing PY-O-214 (page 1-4-1A).

"A Functional Description of the EDVAC," Moore School of Electrical Engineering, Philadelphia, Pa., November 1, 1949; vol. 1, pages 4-18 to 4-24; vol. II, dwg. 104-3LD-2.

"The EDSAC—An Electronic Calculating Machine," Wilkes and Renwick, Journal of Scientific Instruments; December 1949; pages 385-391.